Dec. 21, 1954 M. D. WELSH 2,697,477
BABY SEAT AND SWING
Filed Nov. 15, 1951 2 Sheets-Sheet 1
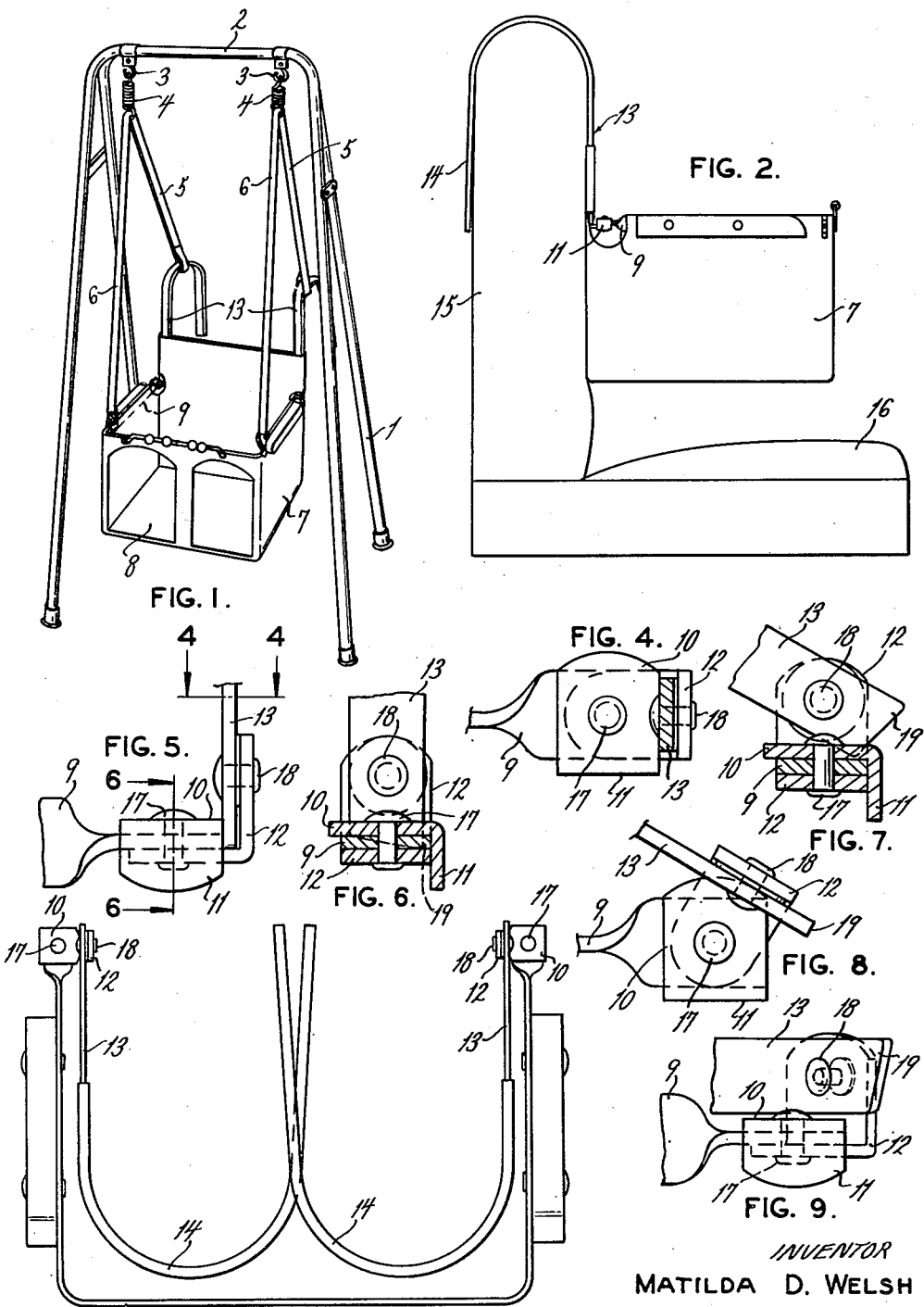
INVENTOR
MATILDA D. WELSH
BY John Cassidy
ATTORNEY Dec. 21, 1954    M. D. WELSH    2,697,477
BABY SEAT AND SWING
Filed Nov. 15, 1951    2 Sheets-Sheet 2

INVENTOR.
MATILDA D. WELSH
BY
*John H Cassidy*
ATTORNEY

United States Patent Office 2,697,477
Patented Dec. 21, 1954

2,697,477

BABY SEAT AND SWING

Matilda D. Welsh, Ladue, Mo.

Application November 15, 1951, Serial No. 256,404

5 Claims. (Cl. 155—79)

This invention pertains to a combination baby seat which may be mounted as a swing or supported on the back of a chair or automobile seat, or the like.

An object of this invention is to provide such a seat which may be made collapsible so as to fold up into a small and compact package, but which when extended for use as a swing will maintain its extended position against the usual tendency of the swing suspension to cause it to collapse.

In accordance with this invention, generally stated, the seat portion in which the baby sits is constructed of fabric, or the like, and is supported by a horizontal frame around the top portion thereof. This frame is provided with hangers at the rear portion thereof by which it may be suspended as a swing or upon the back of an automobile seat, or the like.

These hangers are connected to the frame by a double pivot mounting having vertical and horizontal pivots on which the hangers may be moved to collapsed position. The arrangement is such that in order to collapse the device the hanger must first be moved on its horizontal pivot after which it is swung on the vertical pivot to a position overlying or disposed above and slightly inward of the main supporting frame. A stop on the frame prevents the horizontal swinging movement before the downward movement on the horizontal pivot.

A preferred embodiment of this invention is illustrated in the accompanying drawings, in which Fig. 1 is a perspective view of a swing seat embodying this invention mounted on a stand as a swing;

Fig. 2 is a side view somewhat enlarged of the seat supported on the back of an automobile seat;

Fig. 3 is a plan view of the supporting frame (without the body portion) and the hangers shown in their folded or collapsed position;

Fig. 4 is an enlarged detail of the pivotal connection between the hangers and the frame, taken about on line 4—4 of Fig. 5;

Fig. 5 is a side view of said connection;

Fig. 6 is a section on line 6—6 of Fig. 5;

Fig. 7 is a sectional view similar to Fig. 6, showing the hanger in partly lowered position;

Fig. 8 is a plan view of said connection showing the hanger in its lowered position and with the horizontal swinging movement thereof partly completed;

Fig. 9 is a side view of Fig. 8; and

Figure 10:
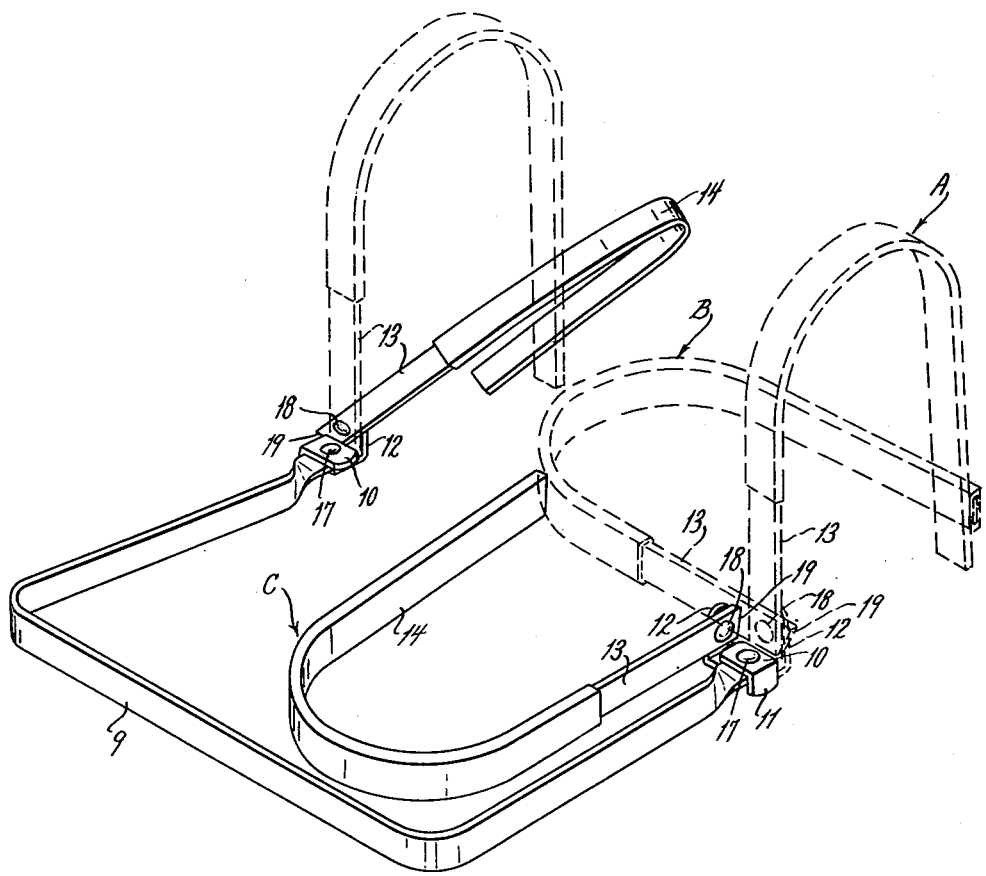
Fig. 10 is an enlarged perspective view of the supporting frame and hangers illustrating the nature of the double pivot movement of the hangers from extended to folded position.

Referring to the drawings, 1 designates a stand of any suitable type, the illustration representing a four-legged swing stand having a horizontal bar 2 from which the seat is suspended as a swing. The suspension may be provided by a pair of hooks 3 from which are suspended spring devices 4, of any suitable type, each of which in turn has suspended therefrom straps 5 and 6 upon which the seat is hung. The seat itself comprises a body portion 7 which may be of fabric or other suitable material, having a seat 8 and suspended from a U-shaped top frame 9. The straps 6 are removably connected to the forward portion of the frame 9, while the straps 5 are each looped about a hanger 13, as shown in Fig. 1. Each hanger may be covered with a length of rubber tubing 14 to prevent damage to articles of furniture upon which it may be supported. As shown in Fig. 2, the hangers 13, which are formed into a hooked shape, are shown applied to the back 15 of an automobile seat 16 so as to support the baby seat thereupon.

It has been found that when a structure similar to this is suspended upon a swing suspension, such as shown in Fig. 1, the tension of the straps 5 sometimes tends to swing the hangers into collapsed position against the back portion of the body 7. To avoid this the double pivot connection, shown in Figs. 4 to 9 inclusive, is provided. Mounted on each side bar of the frame 9, by means of a pivot pin 17, is a double pivot member 12. This member 12 is formed with a right angle bend, the horizontal leg of which is pivoted to the frame 9 at 17 while its vertical leg has pivoted thereto one leg of the hanger 13. The pivot pin 18 by which this connection is made is positioned with its axis transverse to that of the pin 17. A stop member having a horizontal portion 10 is also connected to the frame 9 by the pin 17 and has a downward extending portion 11 providing a stop. As may be seen from Fig. 4, the stop 11 will prevent rotation of the member 12 on the pivot 17 in a clockwise direction, as shown in that figure. This figure represents the right-hand connection shown in Fig. 3, but with the hanger 13 in extended position.

As is also shown in Fig. 4, the element 13, which is fully extended, is in engagement throughout its width with the righthand side portion of the stop member 10. As the end portion of the element 13 extends downward from the pivot 18 far enough to engage said member 10, it will be seen that any pivotal movement of the member 12 on the member 17 will be prevented by such engagement. This end portion, therefore, provides a stop when in this position preventing movement on the vertical pivot 17. This end portion of the element 13 is further extended at one side thereof to form an extended tail portion 19. However, the element 13 may be rotated on its pivot 18 in a direction inward in respect to the frame 9 as shown in Fig. 7, the extended tail portion 19 of said member 13 preventing movement in the opposite direction. After the element 13 has been rotated on the pivot 18 to a horizontal position as shown in Fig. 9, it is clear of the stop member 10 so that the member 12 may now be rotated on the pivot 17 in a horizontal plane but in one direction only, namely, so as to swing the hanger 13 to the position shown in Fig. 3, in which it overlies or is disposed above and inward of the frame 9 and the seat attached thereto, the latter not being shown in Fig. 3.

These movements can be seen more clearly in Fig. 10, showing that in order to fold the device to the position of Fig. 3, each hanger must first be moved downward on the pivot 18 from position A to position B until the tail portion 19 clears the stop 10 after which the hanger is swung horizontally on the pivot 17 to the position C.

This invention, therefore, provides a structure such that when the hangers 13 are in their extended positions, as shown in Fig. 1, the tension of the straps 5, although it may cause a slight movement on the pivots 18, cannot swing the hangers inward on the pivots 17 since the movement is locked by engagement of the tail portion 19 with the stop member 10. However, the folding of the device is easily carried out by two simple movements as described above in connection with Fig. 10.

Various changes may be made in the details of construction, within the scope of the appended claims, without departing from the spirit of this invention. Parts of the invention may be used without the whole and improvements may be added while retaining some or all of the advantages of the invention.

I claim:

1. In a baby seat of the character described having a supporting frame, a seat structure supported on said frame and a hanger having a hook portion for engaging a temporary support for the seat, the improvement comprising, a double-pivot member having a vertical pivot connecting the same to said frame, a second pivot transverse to said first pivot connecting said hanger to said member for movement on both said pivots to folded position overlying said frame, a stop on said frame preventing movement in one direction on said first pivot, and a portion on said hanger engaging said stop when in extended position to prevent similar movement in the opposite direction.

2. In a baby seat of the character described having a supporting frame, a seat structure supported on said frame and a hanger having a hook portion for engaging a temporary support for the seat, the improvement comprising, a double-pivot member having a vertical pivot connecting the same to said frame, a second pivot transverse to said first pivot connecting said hanger to said member for movement on both said pivots to folded position overlying said frame, a stop on said frame preventing movement in one direction on said first pivot, a stop on said hanger preventing movement of said hanger on said second pivot beyond its extended position, and a portion on said hanger engaging said first stop when in extended position to prevent folding movement on said first pivot.

3. In a baby seat of the character described having a supporting frame, a seat structure supported on said frame and a hanger having a hook portion for engaging a temporary support for the seat, the improvement comprising, a double-pivot member having a vertical pivot connecting the same to said frame, a second pivot transverse to said first pivot connecting said hanger to said member for movement on both said pivots to folded position overlying said frame, means for each of said member and said hanger preventing movement on said pivots beyond their extended positions, and a portion of said hanger positioned to lock movement on said first pivot in both directions when said hanger is in its extended position.

4. In a baby seat of the character described having a supporting frame, a seat structure supported on said frame and a hanger normally upstanding from the frame and having a hook portion for engaging a temporary support for the seat; the improvement comprising a means pivoting said hanger to said frame for a first movement about a horizontal axis from its normal upstanding position to an intermediate horizontal position lying in a plane parallel with and adjacent to the horizontal plane of the frame, and pivoting said hanger to said frame for a second movement about a vertical axis from its intermediate horizontal position to a final collapsed horizontal position inwardly of the frame and at right angles to its intermediate position and means associated with said foregoing means preventing said second movement of said hanger until the hanger has been moved to its intermediate position.

5. A baby seat comprising a supporting frame having spaced apart parallel arms having free ends, a seat structure supported on said frame, hangers normally upstanding from the free ends of the arms and having hook portions for engaging a temporary support for the seat, means pivoting said hangers to the free ends of the arms for a first movement thereof about horizontal axes paralleling the axes of the arms from their normal upstanding positions to intermediate horizontal positions lying laterally inwardly of the arms and substantially at right angles thereto, and pivoting said hangers to said arms for a second movement thereof about vertical axes from their intermediate positions to final horizontal positions collapsed within the space between the arms and at right angles to their intermediate positions and means associated with said foregoing means preventing said second movement of said hangers until the hangers have been moved to their intermediate positions.

References Cited in the file of this patent

UNITED STATES PATENTS

| Number | Name | Date |
|---|---|---|
| 1,723,863 | Jeffrey | Aug. 6, 1929 |
| 2,546,790 | Shook | Mar. 27, 1951 |
| 2,563,749 | Rose | Aug. 7, 1951 |
| 2,571,823 | Bonk | Oct. 16, 1951 |